UNITED STATES PATENT OFFICE.

CLARENCE A. MILLS, OF CINCINNATI, OHIO.

BLOOD-COAGULATION MEDIUM.  REISSUED

1,397,896.   Specification of Letters Patent.   Patented Nov. 22, 1921.

No Drawing.   Application filed May 6, 1920. Serial No. 379,404.

*To all whom it may concern:*

Be it known that I, CLARENCE A. MILLS, a citizen of the United States, and a resident of the city of Cincinnati, in the county of Hamilton and State of Ohio, have invented certain new and useful Improvements in Blood-Coagulation Mediums, of which the following is a full, clear, and exact description.

My invention relates to compounds employed in the hastening of coagulation of blood.

It is a known fact that a salt solution extract made from brain tissue will hasten the coagulation of blood, although the reason for this action has not been correctly understood according to results of my investigations.

Tissue as used in the past has been ordinarily brain tissue, although I have found that other tissues of the body, such as from the lung and kidney are richer than brain tissue in the products which cause blood to coagulate.

Taking up lung tissue, which I have found to be the richest in the elements desired for my purpose I find that it contains around ten per cent fats, fifteen per cent. proteins, around one per cent. mineral salts and the balance water. All of the fats are not soluble in salt solution, and only a certain portion of the fats combined with the proteins will dissolve in salt water. The above percentage analysis is merely approximate.

I will first describe the essential product of the human tissue which according to my investigations cause the blood to coagulate.

According to present terminology this product is a combination of a protein and a phospho-lipin. A phospho-lipin is a body fat found in the tissues of the body and containing phosphorus and the protein and fat compound is of the class called "globulin." Globulins are characterized by being soluble only in dilute salt solution, (0.9% NaCl.) and by precipating from such a solution upon saturation thereof with NaCl, $Na_2SO_4$, $MgSO_4$, or half saturation with $(NH_4)_2SO_4$.

I have found that the special globulin having the coagulating action will separate out as a precipitate by making the solution very weak in acid, the best acidity being .002 normal acid. Since this globulin is not soluble in pure water, it is possible to wash all of the acid off by pure water, after which the globulin can be dissolved in .9% salt solution to the desired strength, and employed as a coagulant for blood. Around 35% of the globulin is phospho-lipin and by the addition of more of the phospho-lipin the activity of the globulin increases.

As a matter of commercial importance this globulin would hardly be practical as a product for use as a coagulant since it requires many acid and washing treatments to obtain it, and since any false step might destroy the material which will coagulate of itself with heating or be destroyed with excessive acidity.

I have evolved a commercial process which results in quite as effective and powerful a blood coagulant, however, which I will proceed to describe. The basis of success of my process and the product thereof is the above noted capacity of the special globulin to take up additional phospho-lipin, whereupon its characteristics as a blood coagulant are greatly enhanced.

I may state at the outset that according to my investigations the product I am about to describe has around 16 times the strength of a salt water solution of brain tissue such as has been employed in the past for the coagulation of blood. This ratio is arrived at by comparing the coagulating action on a portion of blood, of varying solutions of the two products. By this means I find that my products may be 16 times as weak in solution and have the same action on the blood, as the old salt water brain tissue solution.

In the production of my commercial material I take preferably lung tissue, and after washing it, I grind it into a salt water of around .9% salt. This removes the various proteins from the tissue together with the fats that are contained in the proteins. Certain insoluble fats are not extracted, and to separate the solution of tissue proteins and soluble fats from the remaining tissue I have found it best to employ a centrifugal machine, similar to a cream separator, the process being known as "centrifuging."

I take other tissue, preferably brain tissue, which is rich in fats, and separate the fats from the tissue by means of treatment with ether, alcohol, benzene and allied products, carbon bisulfid, chloroform, carbon tetra chlorid, or the like and evaporate off the solvent, at the lowest practical temperature.

I have then two materials, one a salt solution of proteins of various kinds, with my special globulin present among them and containing its normal fat content, but with the total fat content of the solution well below that of normal tissue, due to the comparatively low solubility of the fats. The other material is a fatty mass containing the various fats of animal tissue free of proteins.

My next step is to work the fats into the solution, which I do in some desired form of grinding mortar, in which it is possible to crush and grind the fats in the presence of the protein solution.

All of the fats will not be absorbed in the solution, and there will be a semi-solid residue from this last operation. It should be continued, however, to an extent determined by test as the point where continued addition of fats gives no strengthening of the resultant solution. I can give no definite proportions because the richness in proteins of the salt solution will determine the amount of fats that will enter into solution therewith and because it is comparatively easy to test the action by a sample applied to a few drops of blood. I have found that a "saturated" point is reached beyond which further additions of fat are not of any value.

I have in practice added caustic soda to the final solution of the above process, to prevent a precipitation which takes place of some of the fats preferably making the solution .002 normal NaOH. This precipitation does not appear to affect the strength of the final products but I prefer that it be done, if for no other purpose, to avoid the chances of bad commercial appearance.

I do not find that any value is conferred by this addition of the fats on coagulating action, except that they seem to combine with and enrich the proteins which are of the special globulin class and the coagulating force on blood of the resultant solution is increased in the fully saturated form to a large per cent. over normal. The special phospho-lipins have a slight effect on coagulation as do the proteins without the fats, but the combination of additional fat to the special globulin is the decisive factor.

I do not wish to base my invention upon the theories advanced above but upon the fact that the process and product result in a very greatly increased coagulating tendency on blood over any product hitherto known to the art.

It might be that the isolated globulin, (not yet named by me) may be possible of commercial production but this I cannot predict as far as my present experiments have developed. I do know that the weaker the tissue solution is in the special globulin the weaker the coagulating action on blood and that from whatever organic form the globulin described can be obtained, it will do the desired work and will increase in activity of the special fat.

Having thus described my invention, what I claim as new and desire to secure by Letters Patent, is:—

1. A blood coagulant which comprises a protein, phospho-lipin compound having the distinctive quality over related globulins of precipitating from solution upon making of the same weakly acid.

2. A blood coagulant which comprises a protein, phospho-lipin compound having the distinctive quality over related globulins of precipitating from solution upon making of the same weakly acid, combined with additional phospho-lipin.

3. A blood coagulant which comprises a protein, phospho-lipin compound having the distinctive quality over related globulins of precipitating from solution upon making of the same weakly acid, combined with additional phospho-lipin, said substance held in salt solution.

4. A blood coagulant which comprises a protein, phospho-lipin compound having the distinctive quality over related globulins of precipitating from solution upon making of the same weakly acid, combined with additional phospho-lipin, said substance held in salt solution, and said solution made slightly alkaline such as approximately .002 normal NaOH.

5. A blood coagulant comprising animal tissue or extract thereof, combined with additional phospho-lipin so as to bring the phospho-lipin content in excess of normal.

CLARENCE A. MILLS.